(12) United States Patent
Buset et al.

(10) Patent No.: US 10,784,955 B2
(45) Date of Patent: Sep. 22, 2020

(54) METHOD AND APPARATUS FOR RAPID RECOVERY OF OPTICAL POWER AFTER TRANSIENT EVENTS IN C+L BAND OPTICAL NETWORKS

(71) Applicant: Infinera Corporation, Sunnyvale, CA (US)

(72) Inventors: Jonathan M. Buset, San Jose, CA (US); Omer F. Yilmaz, Palo Alto, CA (US); Xian Xu, San Francisco, CA (US); Steve Sanders, Los Altos, CA (US)

(73) Assignee: Infinera Corporation, Sunnyvale, CA (US)

( * ) Notice: Subject to any disclaimer, the term of this patent is extended or adjusted under 35 U.S.C. 154(b) by 0 days.

(21) Appl. No.: 16/683,051

(22) Filed: Nov. 13, 2019

(65) Prior Publication Data

US 2020/0153502 A1 May 14, 2020

Related U.S. Application Data

(60) Provisional application No. 62/760,074, filed on Nov. 13, 2018.

(51) Int. Cl.
*H04B 10/00* (2013.01)
*H04B 10/03* (2013.01)
*H04J 14/02* (2006.01)
*H04J 14/00* (2006.01)

(52) U.S. Cl.
CPC ............ *H04B 10/03* (2013.01); *H04J 14/021* (2013.01); *H04J 14/0221* (2013.01)

(58) Field of Classification Search
CPC ................ H04B 10/03; H04B 10/0777; H04B 10/0797; H04B 10/294; H04B 10/2941; H04B 10/2942; H04B 10/296
See application file for complete search history.

(56) References Cited

U.S. PATENT DOCUMENTS 6,064,501 A * 5/2000 Roberts ............ H04B 10/07955
359/341.44
2009/0201576 A1* 8/2009 Bolshtyansky ..... H01S 3/06754
359/341.33

* cited by examiner

*Primary Examiner* — Daniel G Dobson
(74) *Attorney, Agent, or Firm* — Dunlap Codding P.C.; David L. Soltz (57) ABSTRACT

An optical device having an amplifier and a controller is described. The amplifier is configured to amplify an optical signal in at least one of the C-Band or the L-Band. The controller includes a processor and a non-transitory computer readable medium. The non-transitory computer readable medium storing computer executable code that when executed by the processor causes the processor to: select a target tilt and gain setting from a plurality of target tilt and gain settings stored in the non-transitory computer readable medium based on the type of fault event message responsive to a fault event message affecting the C-band or the L-Band. The selected and pre-calculated target tilt and gain settings are applied to the amplifier.

9 Claims, 8 Drawing Sheets

METHOD AND APPARATUS FOR RAPID RECOVERY OF OPTICAL POWER AFTER TRANSIENT EVENTS IN C+L BAND OPTICAL NETWORKS

INCORPORATION BY REFERENCE

The present patent application hereby claims priority to the provisional patent application identified by U.S. Ser. No. 62/760,074 filed on Nov. 13, 2018, the entire content of which is hereby incorporated by reference.

BACKGROUND

Optical networking is a communication means that utilizes signals encoded in light to transmit information in various types of telecommunications networks. Optical networking may be used in relatively short-range networking applications such as in a local area network (LAN) or in long-range networking applications spanning countries, continents, and oceans. Generally, optical networks utilize optical amplifiers, a light source such as lasers or LEDs, and wave division multiplexing to enable high-bandwidth, transcontinental communication.

Optical networks include both free-space optical networks and fiber optic networks. Free-space networks transmit signals across open space without the use of a specific medium for the light. An example of a free-space optical network includes Starlink by SpaceX. A fiber-optic network, however, utilizes fiber optic cables made of glass fiber to carry the light through a network.

As the optical signal traverses the fiber optic cable, the signal may lose strength. Changes in channel loading cause a spectral loading change and a tilt that is amplified based on the number of line spans between terminals.

In conventional systems, when a failure occurs within the signal travelling within the fiber optic cable, the failure is not accounted for until the next power control cycle, which can be hundreds of seconds after the failure is detected. Certain failures do not affect all of the optical signals being transmitted, but can affect the channel loading in a way to cause the unaffected signals to have a bit error rate exceeding a threshold, thereby causing the unaffected signals to become unreadable due to a low signal to noise ratio.

Thus, a need exists for a method and apparatus for rapid recovery of optical power after transient events in C Band, L Band, and/or C+L Band optical networks.

SUMMARY

The problem of not accounting for failures until the next power control cycle is solved with the methods and systems described herein, including selecting a target tilt and gain setting from a plurality of target tilt and gain settings stored in a non-transitory computer readable medium based on the type of fault event message responsive to a fault event message affecting the C-band or the L-Band. The selected and pre-calculated target tilt and gain settings are applied to an amplifier to correct for the particular type of fault event detected.

BRIEF DESCRIPTION OF SEVERAL VIEWS OF THE DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale or in schematic in the interest of clarity and conciseness. Not every component may be labeled in every drawing. Like reference numerals in the figures may represent and refer to the same or similar element or function. In the drawings.

DETAILED DESCRIPTION

Before explaining at least one embodiment of the disclosure in detail, it is to be understood that the disclosure is not limited in its application to the details of construction, experiments, exemplary data, and/or the arrangement of the components set forth in the following description or illustrated in the drawings unless otherwise noted.

The disclosure is capable of other embodiments or of being practiced or carried out in various ways. Also, it is to be understood that the phraseology and terminology employed herein is for purposes of description and should not be regarded as limiting.

As used in the description herein, the terms "comprises," "comprising," "includes," "including," "has," "having," or any other variations thereof, are intended to cover a non-exclusive inclusion. For example, unless otherwise noted, a process, method, article, or apparatus that comprises a list of elements is not necessarily limited to only those elements but may also include other elements not expressly listed or inherent to such process, method, article, or apparatus.

Further, unless expressly stated to the contrary, "or" refers to an inclusive and not to an exclusive "or". For example, a condition A or B is satisfied by one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more, and the singular also includes the plural unless it is obvious that it is meant otherwise. Further, use of the term "plurality" is meant to convey "more than one" unless expressly stated to the contrary.

As used herein, qualifiers like "substantially," "about," "approximately," and combinations and variations thereof, are intended to include not only the exact amount or value that they qualify, but also some slight deviations therefrom, which may be due to computing tolerances, computing error, manufacturing tolerances, measurement error, wear and tear, stresses exerted on various parts, and combinations thereof, for example.

As used herein, any reference to "one embodiment," "an embodiment," "some embodiments," "one example," "for example," or "an example" means that a particular element, feature, structure or characteristic described in connection with the embodiment is included in at least one embodiment and may be used in conjunction with other embodiments. The appearance of the phrase "in some embodiments" or "one example" in various places in the specification is not necessarily all referring to the same embodiment, for example.

The use of ordinal number terminology (i.e., "first", "second", "third", "fourth", etc.) is solely for the purpose of differentiating between two or more items and, unless explicitly stated otherwise, is not meant to imply any sequence or order of importance to one item over another.

The use of the term "at least one" or "one or more" will be understood to include one as well as any quantity more than one. In addition, the use of the phrase "at least one of X, Y, and Z" will be understood to include X alone, Y alone, and Z alone, as well as any combination of X, Y, and Z.

A reconfigurable add-drop multiplexer (ROADM) node is an all-optical subsystem that enables remote configuration of wavelengths at any ROADM node. A ROADM is software-provisionable so that a network operator can choose whether a wavelength is added, dropped, or passed through the ROADM node. The technologies used within the ROADM node include wavelength blocking, planar lightwave circuit (PLC), and wavelength selective switching (WSS)—though the WSS has become the dominant technology. A ROADM system is a metro/regional WDM or long-haul DWDM system that includes a ROADM node. ROADMs are often talked about in terms of degrees of switching, ranging from a minimum of two degrees to as many as eight degrees, and occasionally more than eight degrees. A "degree" is another term for a switching direction and is generally associated with a transmission fiber pair. A two-degree ROADM node switches in two directions, typically called East and West. A four-degree ROADM node switches in four directions, typically called North, South, East, and West. In a WSS-based ROADM network, each degree requires an additional WSS switching element. So, as the directions switched at a ROADM node increase, the ROADM node's cost increases.

As used herein, a span is the spread or extent of a fiber optic cable between the fiber optic cables' terminals. Generally, a span is an unbroken or uninterrupted segment of fiber optic cable between amplifiers. For instance, if a fiber optic cable carried a signal from node A through a repeater or amplifier at node B and on to node C, the fiber optic cable is said to have two spans, a first span from node A to node B, and a second span from node B to node C, the length of the spans being the distance between the respective nodes. A span may also be the distance between amplifiers, even if the fiber optic cable has not been terminated. For example, the fiber optic cable may not be terminated at an optical in-line amplifier (described in detail below).

As used herein, a transmission line segment is the portion of a transmission line from a transmitter (e.g. ROADM) transmitting a transmission signal to a receiver (e.g. ROADM) receiving the transmission signal. The transmission line segment may include one or more optical in-line amplifier situated between the transmitter and the receiver.

Raman scattering, also known as spontaneous Raman scattering, is an inelastic scattering of photons by matter, that is, the direction and energy of the light changes due to an exchange of energy between photons and the medium. Inelastic scattering is a fundamental scattering process in which the kinetic energy of an incident particle is not conserved. Stimulated Raman scattering takes place when a signal light is injected into a pump light (light source or original light), which increases the Raman-scattering rate beyond spontaneous Raman scattering. Signal-Signal Stimulated Raman Scattering is Raman scattering caused by the injection of two or more signal lights into a light stream. Raman gain, also known as Raman amplification, is based on stimulated Raman scattering wherein a lower frequency photon induces the inelastic scattering of a higher-frequency photon in an optical medium.

As used herein, gain is a process wherein the medium on which a transmission signal is traveling transfers part of its energy to the emitted signal, in this case the transmission signal, thereby resulting in an increase in optical power. In other words, gain is a type of amplification of the transmission signal.

Amplified spontaneous emission (ASE) is light produced by spontaneous emission that has been optically amplified by the process of stimulated emission in a gain medium. ASE is an incoherent effect of pumping a laser gain medium to produce a transmission signal. If an amplified spontaneous emission power level is too high relative to the transmission signal power level, the transmission signal in the fiber optic cable will be unreadable due to the low signal to noise ratio.

As used herein, the C-Band is a band of light having a wavelength between 1528.6 nm and 1566.9 nm. The L-Band is a band of light having a wavelength between 1569.2 nm and 1609.6 nm. Because the wavelength of the C-Band is smaller than the wavelength of the L-Band, the wavelength of the C-Band may be described as a short, or a shorter, wavelength relative to the L-Band. Similarly, because the wavelength of the L-Band is larger than the wavelength of the C-Band, the wavelength of the L-Band may be described as a long, or a longer, wavelength relative to the C-Band.

As used herein, tilt, also called linear power tilt, is defined as the linear change in power with wavelength over the signal spectrum per 1.0 THz. Due to Raman gain, short wavelength signals provide Raman gain for longer wavelengths. SRS Tilt strength, that is the difference in gain between the longest wavelength and the shortest wavelength of the signals, depends on the transmission signal power, spectral loading, fiber type, and fiber length. As used herein, the tilt arises from power that is depleted from C-band signals to amplify L-band signals. Linear tilt slope can be defined in units of dB/THz. Tilt may be described as linear tilt slope times amplifier bandwidth. For example only, assuming a linear tilt slope of 0.625 dB/THz, tilt in either the C-Band or L-Band would be (0.625 dB/THz*4.8 THz)=3 dB and, assuming a linear tilt slope of 0.4 dB/THz, tilt across both C-Band and L-Band would be (0.4 dB/THz*9.875 THz)=3.95 dB.

Spectral loading is the addition of one or more channel to a specific spectrum of light described by the light's wavelength. When all channels within a specific spectrum are being utilized, the spectrum is described as full spectrum loading.

Figure 1:
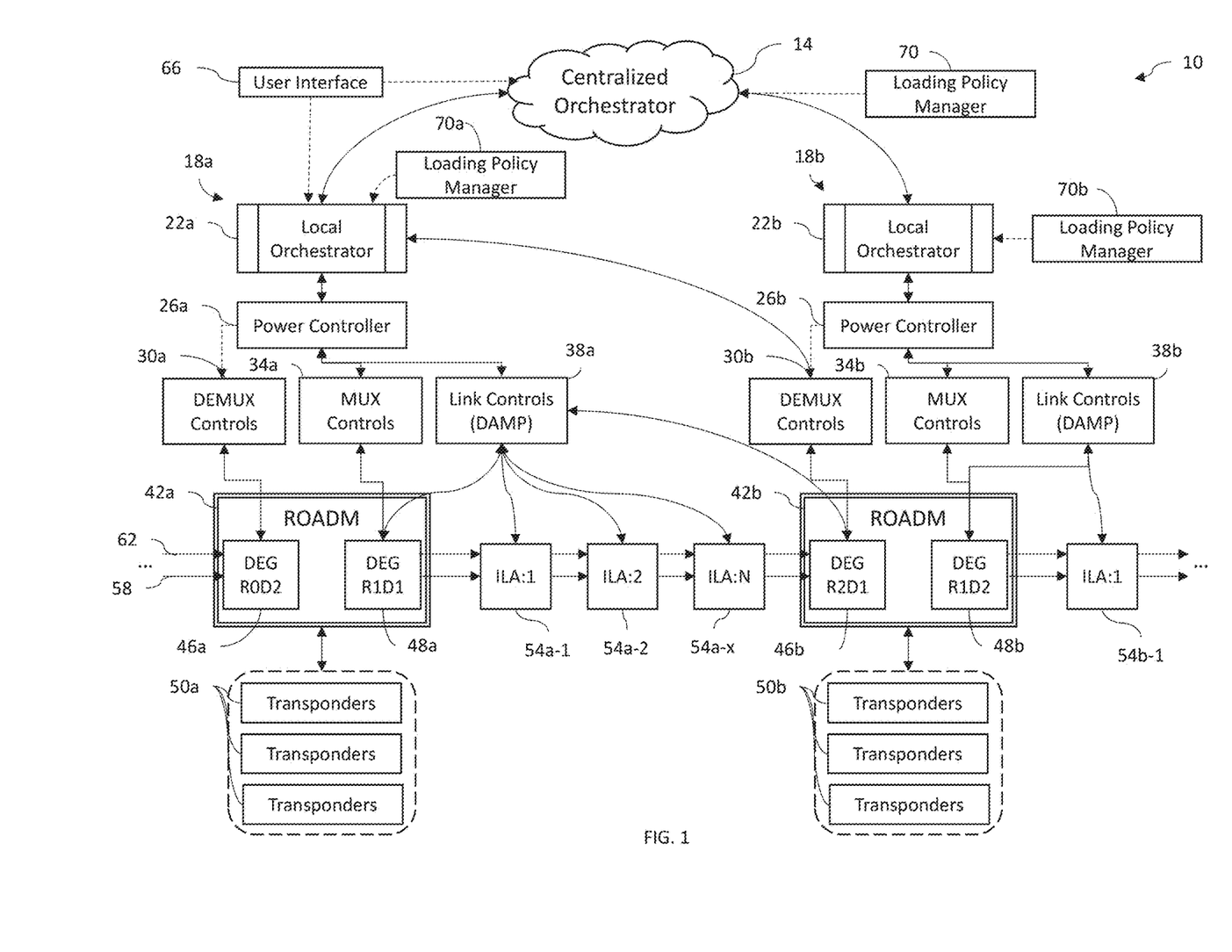
FIG. 1 is a diagram of an exemplary embodiment of a centrally orchestrated optical controller in an optical network.

Referring now to the drawings, and in particular to FIG. 1, shown therein is a centrally orchestrated optical network 10 comprising a centralized orchestrator 14, a link controller 38a, a user interface 66, a loading policy manager 70, and a second optical controller 18b. The first optical controller 18a comprises a local orchestrator 22a, a loading policy manager 70a, a power controller 26a, a DEMUX controller 30a, a MUX controller 34a, a link controller 38a, a ROADM 42a having a receive Degree 46a and a transmit Degree 48a, and a plurality of transponders 50a. Similarly, the second optical controller 18b comprises a local orchestrator 22b, a loading policy manager 70b, a power controller 26b, a DEMUX controller 30b, a MUX controller 34b, a link controller 38b, a ROADM 42b having a receive Degree 46b and a transmit Degree 48b, and a plurality of transponders 50b. The centralized orchestrator 14 and/or the one or more local orchestrator 22 are accessible via a user interface 66. The centrally orchestrated optical network 10 may be a wavelength division multiplexed optical communication system.

Figure 8A:
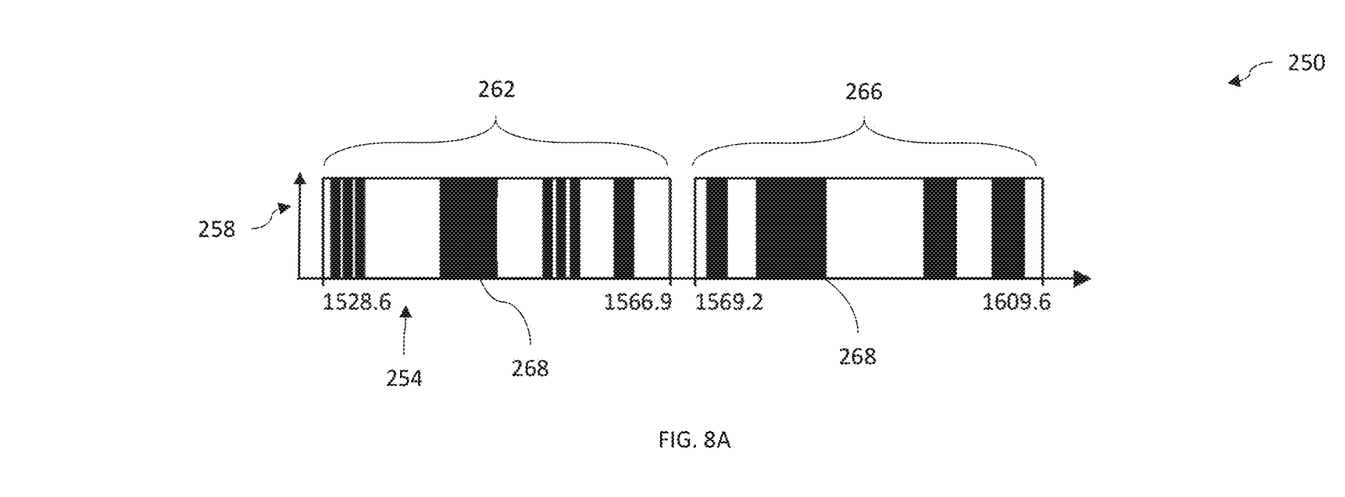
FIG. 8A is an exemplary embodiment of a graph showing a power level of a set of wavelengths at a first instance in time.
Figure 8B:
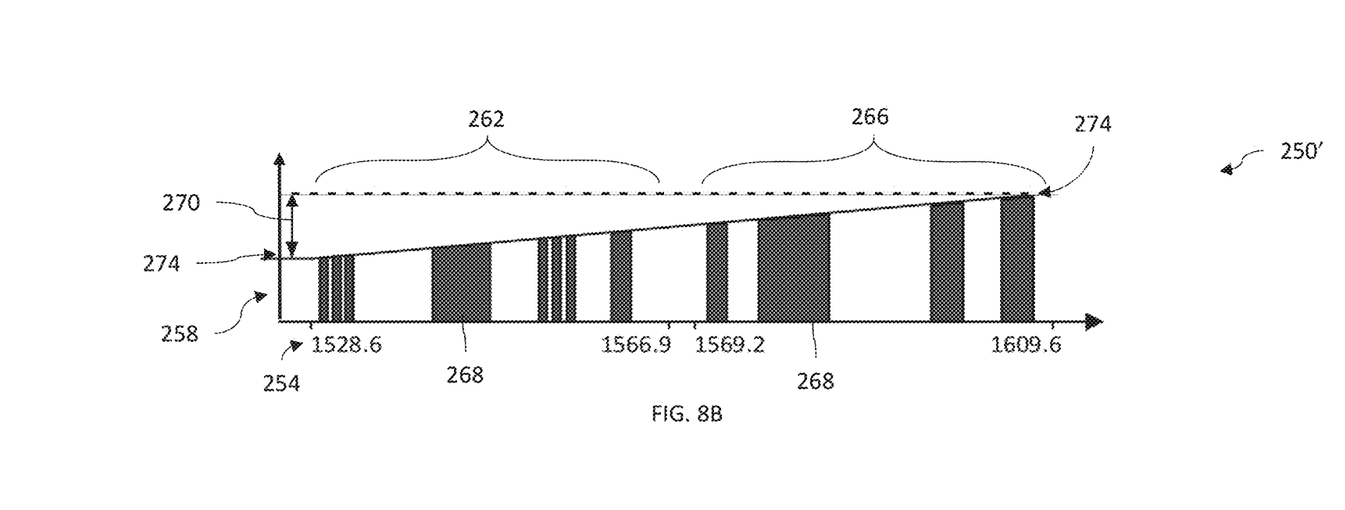
FIG. 8B is an exemplary embodiment of the graph of FIG. 7A showing power level of the set of wavelengths at a second instance in time.

In one embodiment, the local orchestrator 22a generally controls the operations of the power controller 26a, which in turn executes control over the MUX controller 34a and the link controller 38a by providing new data to the transmit Degree 48a through the MUX controller 34a, the new data being data representing services from the second list, or amplification data to the transmit Degree 48a and one or more ILA 54a through the link controller 38a. The power controller 26a determines how the link controller 38a manages amplifier gain settings and amplifier tilt settings. By controlling the transmit Degree 48a, the local orchestrator 22a causes the data signal to be modified to include new services or to remove services currently in place. The fiber line 58 and the fiber line 62 have one or more span and extend between one or more ROADM 42. As shown in FIG. 1, the fiber line 62 and the fiber line 58 span between the transmit Degree 48a and ILA 54a-1 and continue to span between one or more ILA 54a before a last span that terminates at the receive Degree 46b of ROADM 42b. Each of the ILA 54a between the ROADM 42a and the ROADM 42b are controlled by the link controller 38a. The link controller 38a also controls the transmit Degree 48a and the receive Degree 46b. By controlling the transmit Degree 48a and the receive Degree 46b as well as every ILA 54a therebetween, the link controller 38a can adjust the power for each channel to account for and mitigate the tilt of each span. The tilt is depicted in FIGS. 8A and 8B and described below in more detail. Each ILA may be subject to distributed line system amplifier gain and tilt controls by the link controller 38a. The link controller 38a sets the amplifier gain settings to bring output power of the ILA 54 to a preferred level. The link controller 38a determines the appropriate gain settings based on input power of the ILA 54, channel count in the transmission signal, and amplified spontaneous emission (AES) noise. The link controller 38a sets the amplifier tilt settings to correct tilt that occurs in the preceding span. The link controller 38a calculates the expected tilt of a span based on launch power, spectral loading, fiber type, and fiber length. The link controller 38a sends the span tilt estimate and link control information which may include a channel list, channel powers, and accumulated ASE (collectively, DAMP information) to each ILA 54 and each ROAMD 42. The amplifier tilt settings may include tilt values, generally between 0 dB and 4 dB, for each Raman amplifier and tilt values generally between −1 dB and 4 dB, for each EDFA. The amplifier gain settings may include gain values, generally between 5 dB and 17 dB, for each Raman amplifier and gain values, generally between 11 dB and 30 dB, for each EDFA. In another embodiment, the link controller 38a estimates tilt targets and gain targets for each ILA 54 and each ROADM 42.

In one embodiment, the link controller 38 communicates the DAMP information to the transmit degree 48, the one or more ILA 54 and the receive degree 46 via an optical supervisory channel (OSC). The optical supervisory channel may be an optical link between the link controller 38, the transmit degree 48, the one or more ILA 54, and the receive degree 46.

In one embodiment, the centralized orchestrator 14 is running in the cloud, that is, the centralized orchestrator 14 is running on one or more computers accessible via the internet and in communication with one or more local orchestrator 22. In another embodiment, the centralized orchestrator 14 is a local orchestrator 22 having control over all, or a predetermined subset of, other local orchestrators 22.

In one embodiment, each of the one or more local orchestrators 22 can only access information on the transmission line segment of which the transmit Degree 46 is an element under the control of the local orchestrator 22 and cannot share information it has gathered with another orchestrator 22. In other embodiments, the local orchestrator 22 may share traffic dependency information with one or more other local orchestrators 22.

In one embodiment, the centralized orchestrator 14 and the one or more local orchestrators 22 may be accessed by the user interface 66. The user interface 66 provides a user access to a set of operations to perform on a particular transmission line segment. The set of operations may include operations to activate or deactivate a specific service. The set of operations to be performed, is passed to the centralized orchestrator 14 or the local orchestrator 22 where the newly added operations are added to a list of pending operations. The centralized orchestrator 14 or the local orchestrator 22, having a list of pending operations, sends the list of pending operations to a loading policy manager 70. The loading policy manager 70 has a plurality of policies, each policy being an algorithm used to calculate the impact of executing a specific operation on the power level of the transmission signal across all bands. The loading policy manager 70, by evaluating operations in the list of pending operations, determines a set of executable operations to perform in the next cycle in order to minimize the effect on the existing transmission signal. The set of executable operations may be organized in a specific order in which the operations must be executed. Additionally, the set of executable operation may be a subset of operations in the list of pending operations. The loading policy manager 70 provides the set of executable operations to the requesting orchestrator. If the requesting orchestrator is the centralized orchestrator 14, the centralized orchestrator 14 will send the set of executable operations to each local orchestrator 22 per the requirements of the set of executable operations. Each local orchestrator 22 may perform additional checks with its loading policy manager (e.g. loading policy manager 70a or loading policy manager 70b) or may pass the set of executable operations on to the power controller 26. If the requesting orchestrator is the local orchestrator 22, the local orchestrator 22 passes the set of executable operations to the power controller 26, and, if the set of executable operations includes operations for components not under the control of the local orchestrator 22, the local orchestrator 22 may send the set of executable operations to the pertinent local orchestrator 22 or to the centralized orchestrator 14. The power controller 26, having received a set of executable operations, then executes the set of executable operations on the transmission line segment to generate data to configure the MUX controller 34a and the link controller 38a.

Once the transmission line segment has active traffic, the loading policy manager 70 may be the primary mechanism to minimize add/drop power transients such as tilt and power changes during controlled operations. In one embodiment, the loading policy manager 70 evaluates the list of pending operations using both static data and dynamic data. The static data and dynamic data may include C-Band status, L-Band status, a list of active services, fiber span data for each span in the transmission line segment, equipment topology, and carrier wavelengths, also known as carrier locations. Fiber span data may include fiber type, fiber length, transmit launch power target per band, and ILA 54 equipment compositions. In one embodiment, the user may define and/or select one or more of the plurality of policies in the loading policy manager 70. For example, a link with more margin may support aggressive, that is, faster policies, while a link with a lower margin may require conservative, or slower, policies. A policy that supports activating or deactivating a larger number of channels than a second policy is said to be an aggressive policy whereas the second policy is said to be a conservative policy, in other words, the more aggressive a policy is, the larger the tilt generated by loading the selected policies. Differing operation types can use different policies. For example and not by way of limitation, during normal operations, the policy used to determine which services to load may minimize any impact on power level and tilt, such as by loading fewer services at once; however, during optical restoration operations, that is, when restoring from a full network failure, the policy used to determine which services to load may prioritize restoring all channels as fast as possible, thereby permitting some traffic loss.

The transponder 50 receives an electrical input signal and submits that input signal to the ROADM to be multiplexed and included into the transmission signal. The transponder 50 also receives an electrical output signal from the ROADM, after the ROADM has demultiplexed the output signal, and provides a point to which an external component can attach to read the output signal. Transponders 50 have a maximum bit error rate above which the forward error correction does not give error free frames, known as an FEC threshold. Forward error correction is a method of obtaining error control in data transmissions in which the transmitter sends redundant data and the receiver recognizes only the portion of the data that contains no apparent errors. If the bit error rate of the data at the transponders exceeds the FEC threshold, the data is corrupted and unusable. In order to ensure that any changes in the transmission signal will not cause the bit error rate to exceed the FEC threshold, the loading policy manager 70 maintains a Quality Margin, or Q-Margin. The Q-margin at the end of a transmission line segment may be used to refine the policies within the loading policy manager 70. In some embodiments, Q-margins may be as low as 0.5 dB to 1.0 dB for a transmission line segment with full link loading. The loading policy manager 70, when selecting which operations to execute during the next cycle determines which of the operations may be completed in a current activation/deactivation cycle without causing the Q-margin of one or more channel on the transmission signal to fall below the FEC threshold. The Q-margin and/or FEC threshold may be predetermined based on the network design. Any operations not selected during the current activation/deactivation cycle may be added to a list of operations for a subsequent, e.g., next, activation/deactivation cycle. This is the care of normal service operations. However, if operation speed is given priority over Q-margin, such as in optical restoration, the Q-margin may be exceeded.

The MUX controller 34a controls the multiplexer operations within the transmit Degree 48a, thereby controlling what channels are utilized to form the transmission signal. The MUX controller 34a may receive data from one or more transponder 50a and multiplex that data with data already within the transmission signal depending on the commands from the power controller 26a. The DEMUX controller 30a controls the demultiplexer operations of the Degree 46a, such as the decoding of one or more channels from the transmission signal and transmitting those channels either for further processing within the ROADM 42a or transmitting those channels to the one or more transponders 50a. The DEMUX controller 30b is controlled by the first optical controller 18a as the demultiplexer in the transmission line segment is the last component of any particular transmission line segment. Because each transmission line segment is controlled by a local orchestrator, the demultiplexer within the ROADM 42b of the second optical controller 18b is controlled by the local orchestrator 22a of the first optical controller 18a. In another embodiment, the demultiplexer within the ROADM 42b of the second optical controller 18b is controlled by the local orchestrator 22b.

The transmit Degree 46a includes transmitters, each of which supplies an amplitude, BPSK, or QAM modulated optical signal or some combination thereof. Each optical signal may include multiple channels that are routed together, each channel may have one or more Nyquist subcarriers. The receive Degree 48a includes receivers, each sensing or detecting a corresponding modulated optical signal and each performing optical clock and data recovery, and FEC decoding of each modulated optical signal.

It should be noted that FIG. 1 shows only two ROADMs 42 comprising a single traffic direction of a single transmission line segment for brevity. The number of ROADMs 42, and thus the number of transmission line segments, may be dependent on the distance the transmission signal must travel. Additionally, the number of ILA 54a within the transmission line segment shown is limited to three for brevity, however, the number of ILAs 54 within a particular transmission line segment may be determined by the total geographic distance between each ROADM 42 and the fiber span loss that can be compensated for by each ILA 54.

Figure 2:
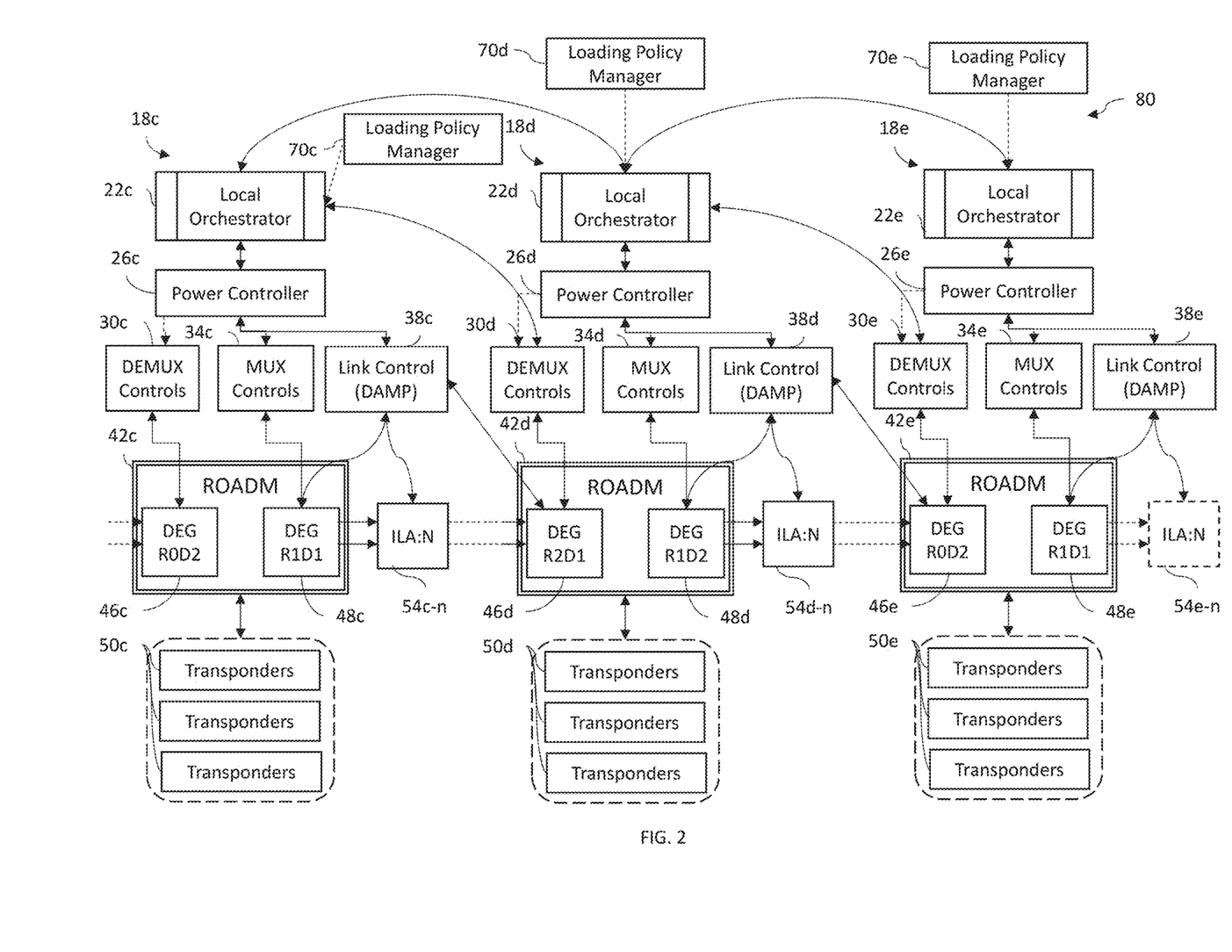
FIG. 2 is a diagram of an exemplary embodiment of a distributively orchestrated optical controller in an optical network.

Referring now to FIG. 2, shown therein is a distributively orchestrated optical network 80 comprising a third optical controller 18c, a fourth optical controller 18d, and a fifth optical controller 18e. Similar to the first optical controller 18a described above, the third optical controller 18c comprises a local orchestrator 22c, a power controller 26c, a DEMUX controller 30c, a MUX controller 34c, and a link controller 38c, setting up and controlling a ROADM 42c having a receive Degree 46c and a transmit Degree 48c. A plurality of transponders 50c provide data into the ROADM 42c to transmit the data through the optical network 80 and/or receive data from the ROADM 42c, The fourth optical controller 18d comprises a local orchestrator 22d, a power controller 26d, a DEMUX controller 30d, a MUX controller 34d, and a link controller 38d setting up and controlling a ROADM 42d having a receive Degree 46d and a transmit Degree 48d. A plurality of transponders 50d provide data into the ROADM 42*d* to transmit the data through the optical network 80 and/or receive data from the ROADM 42*d*. The fifth optical controller 18*e* comprises a local orchestrator 22*e*, a power controller 26*e*, a DEMUX controller 30*e*, a MUX controller 34*e*, and a link controller 38*e* setting up and controlling a ROADM 42*e* having a receive Degree 46*e* and a transmit Degree 48*e*. A plurality of transponders 50*e* provide data into the ROADM 42*e* to transmit the data through the optical network 80 and/or receive data from the ROADM 42*e*. The one or more local orchestrator 22 can access the loading policy manager 70 and are accessible via a user interface 66, not shown. In one embodiment, each optical controller 18*c*, 18*d*, 18*e* includes a loading policy manager 70*c*, 70*d*, 70*e* respectively, whereas, in another embodiment, the loading policy manager 70 is shared in common between all local orchestrators 22*c*, 22*d*, 22*e*.

Generally, the operation of the distributively orchestrated optical network 80 is similar to the operation of the centrally orchestrated optical network 10, however, upon receipt of the executable operations from the loading policy manager 70, each local orchestrator 22 may send all executable operations for the transmission line segment over which that particular local orchestrator 22 can execute control to its respective power controller 26 and send a request to neighboring orchestrators having a list of executable operations for a transmission line segment over which the particular orchestrator cannot execute control.

In one embodiment, when the local orchestrator 22*d*, for example, receives executable operations from either local orchestrator 22*c* or local orchestrator 22*e*, the local orchestrator 22*d* adds the executable operations to the list of pending operations, which is then submitted to the loading policy manager 70. In another embodiment, when the local orchestrator 22*d* receives executable operations from either local orchestrator 22*c* or local orchestrator 22*e*, the local orchestrator 22*d* executes the executable operations on the next cycle.

It should be noted that FIG. 2 shows only three optical controllers 18, comprising two transmission line segments for brevity. The number of optical controllers 18, and thus the number of transmission line segments, may be dependent on the distance the transmission signal must travel. Additionally, the number of ILA 54 within each transmission line segment shown is limited to one for brevity, however, the number of ILAs 54 within any particular transmission line segment may be determined by calculating the number of amplifiers needed to compensate for the tilt of each span within the geographic distance between each ROADM 42.

Figure 3A:
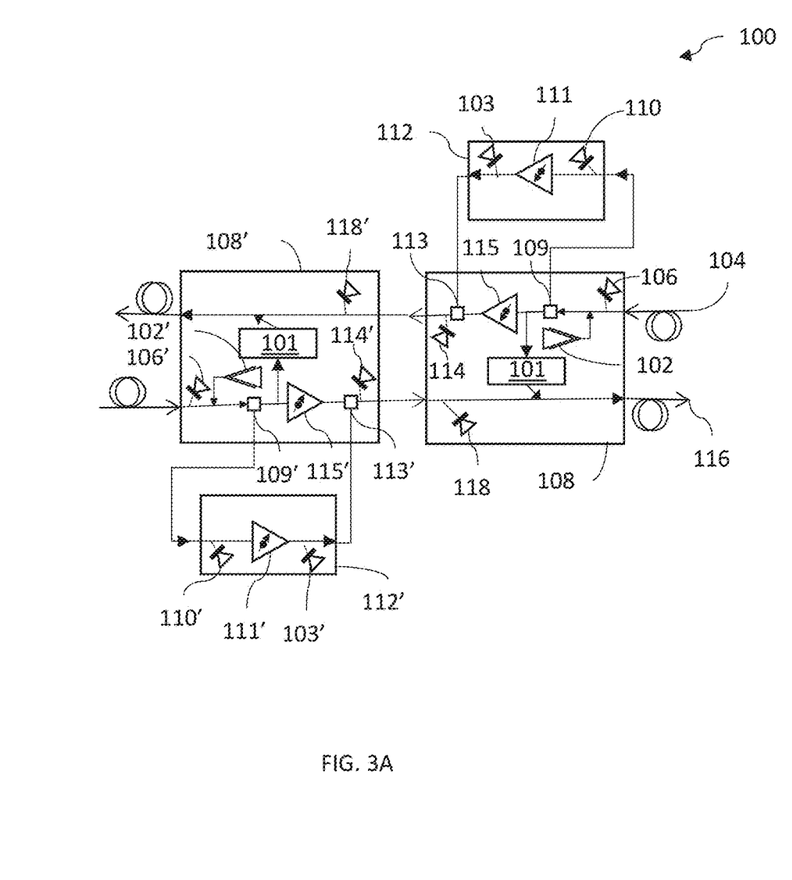
FIG. 3A is a diagram of an exemplary embodiment of an optical in-line amplifier.

Referring now to FIG. 3A, shown therein is a first optical in-line amplifier 100. The first optical in-line amplifier 100 is a node and one type of optical in-line amplifier 54 as described above, configured of erbium-doped fiber amplifiers (EDFA), at least one optical supervisory channel 101, and one or more Raman pump lasers 102. The first optical in-line amplifier 100 is coupled to a first fiber optic span 104 with a first transmission signal, having a C-Band portion and an L-Band portion, traveling in a first direction, the first transmission signal being sampled by a first photodiode 106 of a hybrid C-Band card 108 via the first fiber optic span 104, the first transmission signal then being amplified by a Raman pump 102, the L-Band portion, split from the first transmission signal by a C+L Band WDM filter 109, being sampled by a second photodiode 110, amplified by an L-Band erbium amplifier 111 within the L-Band card 112, and sampled by an L-Band amplifier output photodiode 103, then re-entering the hybrid C-Band card 108 and recombining, through a C+L Band WDM combiner 113, with the C-Band portion forming a first amplified transmission signal once the C-Band portion passes through a C-Band erbium amplifier 115 and arrives at the third photodiode 114. The first amplified transmission signal is sampled by the third photodiode 114, passes through a hybrid C-Band card 108', and is sampled by a passthrough photodiode 118'. The first optical in-line amplifier 100 is further coupled to a second fiber optic span 116 with a second transmission signal, having a C-Band portion and an L-Band portion, traveling in a second direction, the second direction different than the first direction. The second transmission signal enters the hybrid C-Band card 108' and sampled via a first photodiode 106' coupled to the second fiber optic span 116 at the input port, the first transmission signal is then amplified by a Raman pump 102'. The L-Band portion, split from the second transmission signal by a C+L Band WDM filter 109', is sampled by a second photodiode 110', amplified by an L-Band erbium amplifier 111', and sampled by an L-Band amplifier output photodiode 103' within an L-Band card 112' then re-enters the hybrid C-Band card 108' and is recombined at a C+L Band WDM combiner 133' with the C-Band portion forming a second amplified transmission signal once the C-Band portion passes through a C-Band erbium amplifier 115'. The second amplified transmission signal is sampled by the third photodiode 114'. The second amplified transmission signal then passes through the hybrid C-Band card 108 and is sampled by a passthrough photodiode 118. In one embodiment, the Raman pump 122 may be more than one Raman pump 122.

Figure 3B:
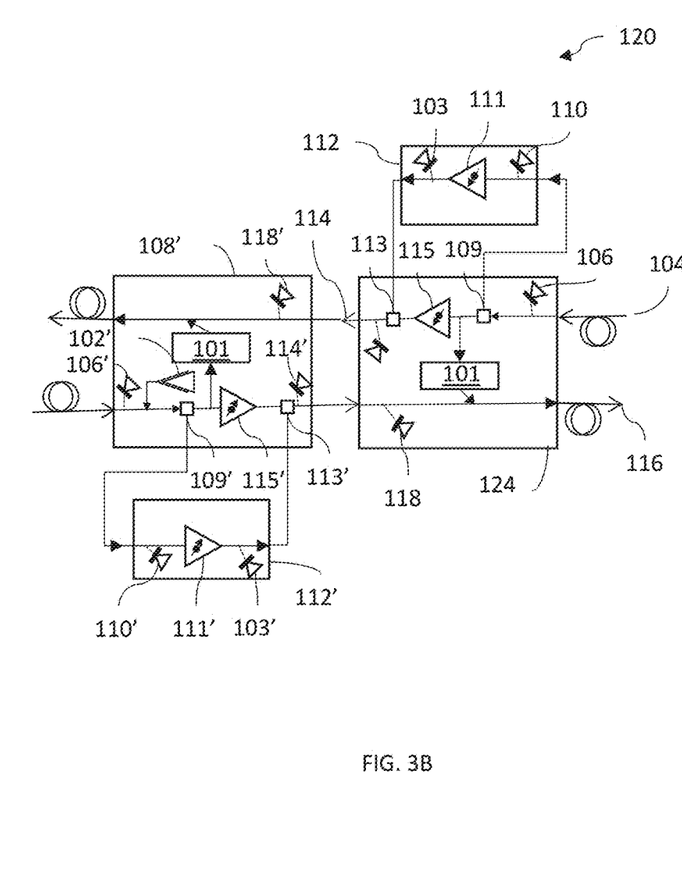
FIG. 3B is a diagram of an alternative exemplary embodiment of an optical in-line amplifier.

Referring now to FIG. 3B, shown therein is a second optical in-line amplifier 120. The second optical in-line amplifier 120 is a node and one type of optical in-line amplifier 54 as described above, configured of erbium-doped fiber amplifiers (EDFA), at least one optical supervisory channel 101, and a Raman pump laser 102. The second optical in-line amplifier 120 is coupled to a first fiber optic span 104 with a first transmission signal, having a C-Band portion and an L-Band portion, traveling in a first direction, the first transmission signal being sampled by a first photodiode 106 of a C-Band card 124 via the first fiber optic span 104, the L-Band portion, split from the first transmission signal by a C+L Band WDM filter 109, being sampled by a second photodiode 110, amplified by an L-Band erbium amplifier 111 and being sampled by an L-Band amplifier output photodiode 103 within the L-Band card 112 then re-entering the C-Band card 124 and recombining, through a C+L Band WDM combiner 113 with the C-Band portion forming a first amplified transmission signal once the C-Band portion passes through a C-Band erbium amplifier 115 and arrives at the third photodiode 114. The first amplified transmission signal is then sampled by the third photodiode 114 and passes through a hybrid C-Band card 108' and is sampled by a passthrough photodiode 118'. The second in-line amplifier 120 is further coupled to a second fiber optic span 116 with a second transmission signal, having a C-Band portion and an L-Band portion, traveling in a second direction, the second direction different than the first direction. The second transmission signal enters the hybrid C-Band card 108' and is sampled via a first photodiode 106', the second transmission signal then being amplified by a Raman pump 102', the L-Band portion, split from the second transmission signal by a C+L Band WDM filter 109', being sampled by a second photodiode 110', amplified by an L-Band erbium amplifier 111', and sampled by an L-Band amplifier output photodiode 103' within an L-Band card 112' then re-entering the hybrid C-Band card 108' and recombining, through a C+L Band WDM combiner 113', with the C-Band portion forming a second amplified transmission signal once the C-Band portion passes through a C-Band erbium amplifier 115' and arrives at the third photodiode 114'. The second amplified transmission signal is then sampled by the third photodiode 114' and passes through the C-Band card 124 and is sampled by a passthrough photodiode 118.

Referring back to FIG. 3A and FIG. 3B, the Raman pump is utilized to compensate for most of the tilt experienced in the previous span by increasing the overall gain of both the C+L Bands with the final tilt compensation being adjusted by the EDFA. Settings are provided to set the EDFAs with different gain ranges to handle different tilts. The EDFA-L is designed with a specific gain range to handle tilt within the L-Band and the EDFA-C is designed with a specific gain range to handle tilt within the C-Band. Changes in tilt due to changes in channel loading require the link controller 38 to modify both tilt and gain settings of the optical in-line amplifiers and ROADMs. ASE may be generated by the Raman amplification process, which must be considered when determining the gain of the Raman amplifiers and EDFAs.

For brevity, FIGS. 3A and 3B depict only two embodiments of configurations of C-Band cards 124, L-Band cards 112 and Hybrid C-Band Cards 108, however, it should be noted that other configurations may be used as well. For example, in FIG. 3B, the first signal passes through the C-band card 124 first and the hybrid C-Band card 108' second, however, another embodiment of an optical in-line amplifier may have the first signal passing through the hybrid C-Band card 108 first and then a C-Band card 124 second. Yet another embodiment may have the first signal passing through the C-Band card 124 at a first instance in time and then a second C-Band card 124' at a second instance in time, the second instance in time occurring after the first instance in time.

Figure 4:
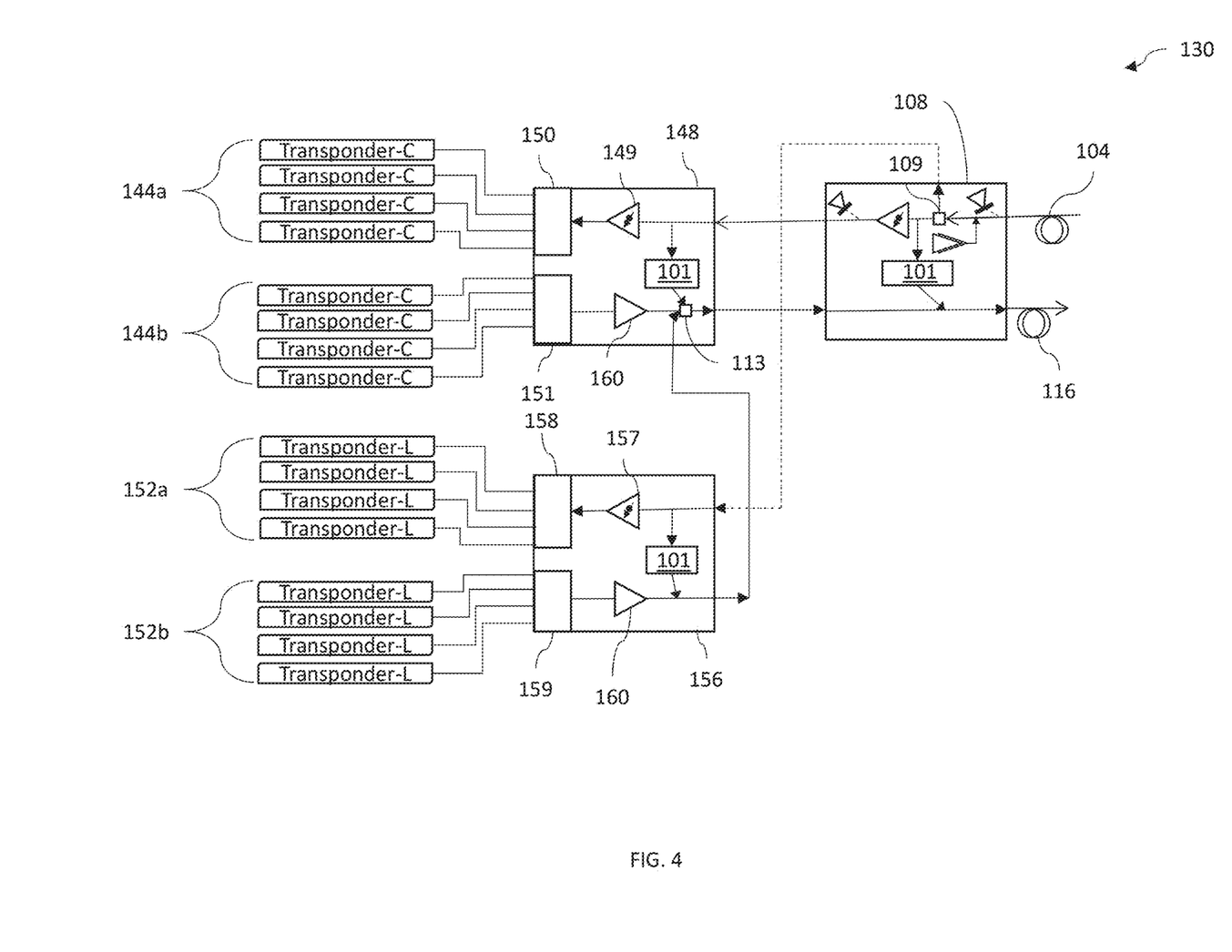
FIG. 4 is a diagram of an exemplary embodiment of a C+L band terminal in an optical network.

Referring now to FIG. 4, shown therein is a C+L Band terminal site 130 having a plurality of C-Band transponders 144, including receivers 144a and transmitters 144b, connected to a C-Band ROADM 148 and a plurality of L-Band transponders 152, including receivers 152a and transmitters 152b, connected to an L-Band ROADM 156, the C-Band ROADM 148 and the L-Band ROADM 156 coupled together and connected to a hybrid C-Band card 108, the hybrid C-Band card 108 connected to the first fiber optic span 104 having the first transmission signal traveling in the first direction and connected to the second fiber optic span 116 having the second transmission signal traveling in the second direction. The first transmission signal traveling in the first direction enters a diverter where a C-Band portion of the first transmission signal enters the C-Band ROADM 148, is amplified by an amplifier 149, and is then demultiplexed by demultiplexer 150 before traveling to receivers 144a of the C-Band transponders 144, and where an L-Band portion of the first transmission signal enters the L-Band ROADM 156, is amplified by an amplifier 157, and is then demultiplexed by a demultiplexer 158 before traveling to receivers 152a of the L-Band transponders 152. The C-Band portion of the second transmission signal traveling in the second direction originates at transmitters 144b of the C-Band transponders 144, is multiplexed by a multiplexer 151 before being boosted by an EDFA 160. The L-Band portion of the second transmission signal traveling in the second direction originates at transmitters 152b of the L-Band transponders 152, is multiplexed by a multiplexer 159 before being encoded by the EDFA 160. The C-Band portion and the L-Band portion are then combined to form the second transmission signal which passes through the hybrid C-Band card 108 to the second fiber optic span 116. In other embodiments, the C+L Band terminal site 130 may not include the Hybrid C-Band card 108. Additionally, while receivers 144a and transmitters 144b are shown independently, each transponder 144 is comprised of a transmitter 144b and a receiver 144a. The transponder 144 is diagramed as two elements, the receiver 144a and the transmitter 144b, for simplicity of the diagram. Similarly, while receivers 152a and transmitters 152b are shown independently, each transponder 152 is comprised of a transmitter 152b and a receiver 152a. The transponder 152 is diagramed as two elements, the receiver 152a and the transmitter 152b, for simplicity of the diagram.

In one embodiment, the local orchestrator 22a is a computer having software stored in non-transitory memory accessible by a processor that causes the processor to perform the controlling operation described above. In one embodiment, the power controller 26a is an element of and contained within the local orchestrator 22a. Alternatively, the power controller 26a may be an element of the ROADM 42a field replaceable unit (FRU). When the power controller 26a is an element of the ROADM 42a FRU, the MUX controller 34a, link controller 38a and DEMUX controller 30a are also elements of the ROADM 42a FRU. In one embodiment, the MUX controller 34a and the link controller 38a are elements of the ROADM 42a FRU and/or are elements of the transmit Degree 48a and the DEMUX controller 30a is an element of the receive Degree 46a.

Figure 5:
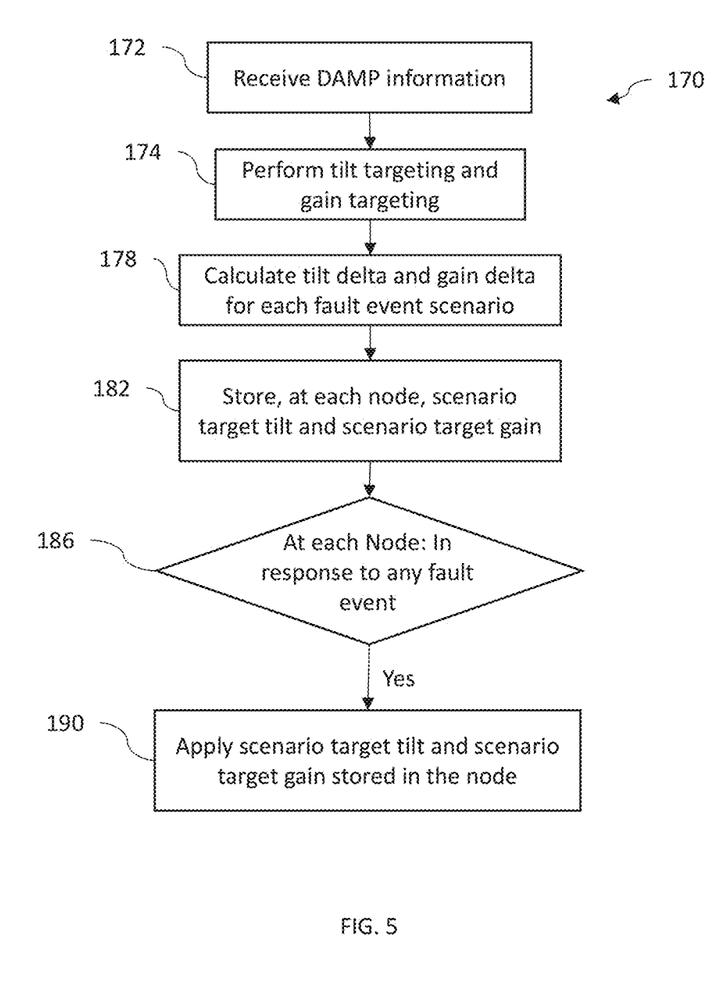
FIG. 5 is a process flow diagram of an exemplary embodiment of a fast, transient recovery process.

Referring now to FIG. 5, shown therein is an exemplary embodiment of the fast transient recovery method 170. A fault event is an unpredicted change in the power level of a signal outside normal signal bounds, especially one that affects the channel load in a transmission signal and may include fault event data such as a location of a fault, a node having the fault, a component that caused the fault, and/or other information so disposed to identify a cause and location for the fault. Fault events may be caused by uncontrolled events such as FRU power loss or failure, cold resets, warm resets, hardware failure, and/or loss of cable continuity, for example. A fault event may cause unexpected tilt (transient tilt) and/or unexpected gain (transient gain) within a span where the tilt settings and gain settings for an ILA 54 have already been determined by the link controller 38 for a specific channel load. The fast transient recovery method 170 adjusts, in response to a fault event, the tilt set points and gain set points at each node to a tilt correction and output power spectral density at the amplifier output without first receiving target tilt and target gain settings responsive to a fault event from the link controller 38 by receiving tilt and gain settings from the link controller before an activation/deactivation cycle (step 172), performing tilt targeting and gain targeting (step 174), calculating tilt delta and gain delta for each fault event scenario (step 178), transmitting the tilt delta and the gain delta to both the C-Band amplifier and the L-Band amplifier (step 182), monitoring each node for fault events (step 186), and, if a fault event is identified, applying tilt set points and gain set points by the amplifier based on the tilt delta and gain delta stored at in the node (step 190). The fault event may be detected locally, at an upstream node, or at a downstream node. A fault-forwarding process comprises detecting a fault event at any upstream node and notifying all upstream nodes and downstream nodes of the fault event so that each node can apply scenario tilt targets and scenario gain targets corresponding to the fault event.

The fault-forwarding process may notify each node of one or more fault event that the particular node would be unable to locally detect.

Figure 6:
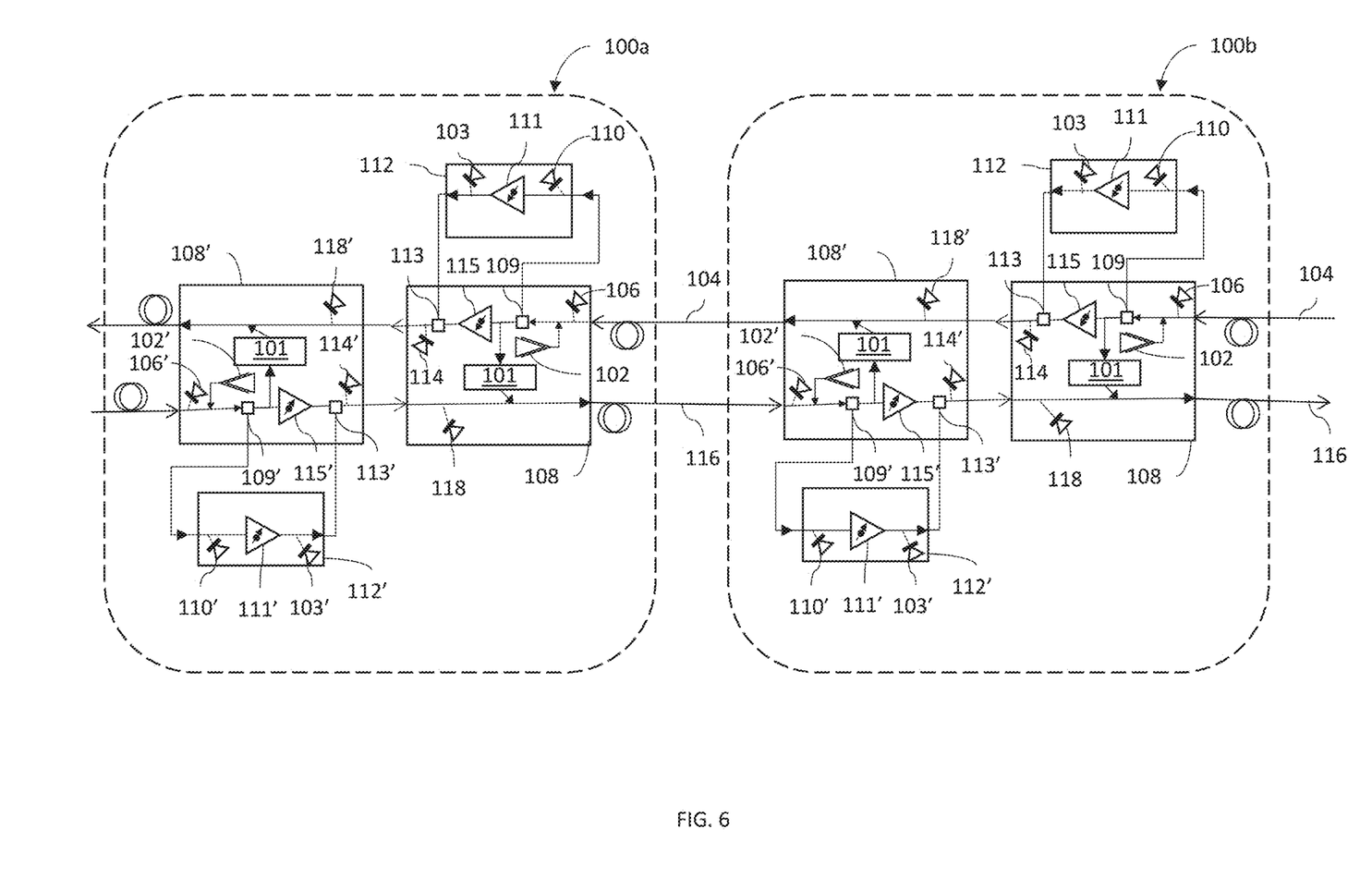
FIG. 6 is a diagram of an exemplary embodiment of two optical in-line amplifiers of FIG. 3A optically connected to each other.

Referring also to FIG. 6, shown therein is an exemplary embodiment of a first node 100a being an in-line optical amplifier, as detailed above in FIG. 3A or FIG. 3B, optically connected via the first fiber optic span 104 and the second fiber optic span 116 to a second node 100b being an in-line optical amplifier, as detailed above in FIG. 3A or FIG. 3B. The first node 100a is said to be downstream of the second node 100b on the first fiber optic span 104 and the first node 100a is said to be upstream of the second node 100b on the second fiber optic span 116. Conversely, the second node 100b is said to be upstream of the first node 100a on the first fiber optic span 104 and the second node 100b is said to be downstream of the first node 100a on the second fiber optic span 116. In other embodiments, each node 100 may include a C-Band EDFA card 124 in place of either the hybrid C-Band card 108 or the hybrid C-Band card 108'.

In one embodiment, receiving DAMP information (step 172) includes receiving, by the first node 100a, network data including, for example: channel loading, including channel location within the spectrum and channel power for each channel, ASE loading, ASE accumulation to the previous nodes, C-Band power target, L-Band power target, signal power at a previous node, or any combination thereof. The first node 100a may also receive a fault event message. The first node 100a additionally stores local data including, for example, upstream fiber type, upstream fiber length, and fiber loss spectra for the C-Band and L-Band. In another embodiment, the first node 100a additionally receives link data from a downstream node on first fiber optic span 104, such as from either an ILA 54 or a ROADM 42, a link data from an upstream node on first fiber optic span 104, such as the second node 100b, a link data from a downstream node on second fiber optic span 116, such as the second node 100b, and a link data from an upstream node on the second fiber optic span 116, such as from either an ILA 54 or a ROADM 42, or some combination thereof. The link data may originate at a head node, such as either an upstream or downstream ROADM 42 and may include local data from each node between, either upstream or downstream, the first node 100a and the head node. The network data, the link data, and the local data may be combined into the DAMP information. The DAMP information may also propagate independently to both upstream nodes and downstream nodes.

In one embodiment, performing tilt targeting and gain targeting (step 174) includes estimating an estimated tilt for both the C-Band and the L-Band due to stimulated Raman Scattering and DAMP information, including, for example, the current channel loading, power per channel in the spectrum, location of channels within the spectrum, local data, such as the fiber type and fiber length, and an assumption of normal operating conditions. Local data may also include photodiode values and estimated ASE. Performing tilt targeting further includes calculating, for each of the C-Band, independently, the L-Band, independently, and the C+L Bands, a Raman amplifier tilt target, a C-Band EDFA tilt target, and a L-Band EDFA tilt target respectively based off of at least the DAMP information received and the estimated tilt accumulated in the previous span. The DAMP information, network data and the local data are used to determine the Raman gain target and the EDFA gain targets required to reach the amplifier target output power, that is, the output power spectral density per channel. The L-Band EDFA tilt target and C-Band EDFA tilt target are each measures, in decibels that indicate EDFA gain settings needed to compensate for tilt that was accumulated over the upstream span, while the Raman gain target is an estimate of the gain needed to reach a target output power. Each of the tilt targets and the gain targets may be stored locally on the node.

In one embodiment, calculating tilt delta and gain delta (step 178) includes calculating the tilt delta for each of a plurality of predetermined fault event scenarios wherein the tilt delta is calculated by determining the difference between a current operating condition and a tilt estimate for a particular predetermined fault event scenario and the gain delta is calculated by determining the difference between the current operating condition and a gain estimate for the particular predetermined fault event scenario. The tilt delta may be calculated in dB and is a relative difference between the particular predetermined fault event scenario and the normal operating conditions. The tilt delta is then used to determine a scenario target tilt for the particular predetermined fault event scenario for each optical in-line amplifier component and ROADM and the tilt gain is the used to determine a scenario target gain for the particular predetermined fault event scenario for each optical in-line amplifier component. Similar to step 174, the scenario tilt target for the C-Band EDFA and the L-Band EDFA are each measures, in decibels that indicate EDFA gain settings needed to compensate for tilt that was accumulated over the upstream span and in consideration of the particular predetermined fault event scenario, while the scenario target gain is an estimate of the gain needed to reach a target output power, that is, the output spectral density power per channel, and in consideration of the particular predetermined fault event scenario. Each of the scenario tilt targets and the scenario gain targets for each of the predetermined fault event scenarios may be stored in local memory on the node. By way of example only, if the normal operating conditions having a gain target of 10 dB and a tilt target of 3 dB and a particular predetermined fault event scenario presented with a delta gain of +1 dB and a delta tilt of +0.5 dB then a scenario target gain would be 11 dB and a scenario target tilt would be 3.5 dB.

In one embodiment, the node 100a recognizes that a fault event has occurred when it identifies a C-Band or L-Band loading change that is a loss of a band and changes observed in the downstream node are based only on the tilt changes due to a band loss. Upon recognizing that the fault event has occurred, the node 100a adjusts local gain settings and local tilt settings to account for the transient tilt and transient gain.

In one embodiment, an optical loss of signal (OLOS) is detected within the node 100a by the first photodiode 106 or the second photodiode 110, thereby triggering an OLOS event, a particular type of fault event. The hybrid C-Band card 108 has a third photodiode 114 for monitoring both the C-Band and the L-Band independently, enabling the C-Band amplifier to detect the optical loss of signal of either the C-Band or the L-Band. The hybrid C-band card 108 and the C-Band EDFA card 124 have the passthrough photodiode 118 that monitors both the C-Band and the L-Band independently as the transmission signal passes through the board. The L-Band card 112 has the L-Band amplifier output photodiode 103 configured to monitor the L-Band power level after the L-Band is amplified by the L-Band erbium amplifier 111. Additionally, an automatic laser shutdown (ALS) message between the hybrid C-Band card 108 and L-Band card 112 can be used to determine a fault event by using messaging frames in order to pass the C-Band optical loss of signal to an associated L-Band card 112. In another embodiment, the optical loss of signal is detected within node 100a based on a band level transmission fault event message from an upstream node 100b. The fault event message allows an upstream node 100b to communicate an optical loss of signal or other fault event to the node 100a, the communication indicating to the node 100a the presence of a fault event. The fault event message may also include fault event data such as a location of a fault event, a node triggering the fault event, a component that caused the fault event, and/or other information so disposed to identify a cause and a location for the fault event. The upstream node 100b determines the fault event by monitoring output power based on the third photodiode 114. For example, if an EDFA, in either the L-Band card 112 or the hybrid C-Band card 108, at the upstream node 100b is offline, the output power measured by the third photodiode 114 within upstream node 100b would be outside an output power threshold thereby causing a fault event, thus necessitating the fault event message. The fault event message is communicated to the node 100a through an optical supervisory channel. The node 100a, having received the fault event message, responds as though the node 100a detected the fault event locally, even if the first photodiode 106 of node 100a indicates power levels in a normal range of operation.

In another embodiment, each node 100 has a fault detection engine. In one embodiment, the fault detection engine may trigger a traffic failure (or fault) by correlating information from the cards within a line amplifier or terminal. The information may include an ALS-L messaging loss of frame, an upstream C-band loss of light, which may be sent via a fault event message, an upstream L-band loss of light, which may be sent via a fault event message, a field replaceable unit lock state, a C-band amplifier cold boot, unplug, or hardware failure, an L-Band amplifier cold boot, unplug, or hardware failure, a C-Band OLOS on various photodiodes, an L-Band OLOS on various photodiodes, an optical supervisory channel loss of frame, an ALS pilot tone OLOS, an EDFA operating state, excess patch cable losses, an optical channel monitor, or an optical performance monitor, or a combination thereof. In some embodiments, the fault detection engine monitors the first photodiode 106, the second photodiode 110, the third photodiode 114, and other node sensors (not shown), as well as the status, such as power consumption and error reports, of other components of the node 100 for faults. Upon detection of a fault that may or may not impact the data path, the fault detection engine sends a fault event message to both upstream nodes and downstream nodes through the optical supervisory channel and identifies the one or more component of the node 100 causing the fault event. In one embodiment, the fault detection engine is software stored on non-transitory memory and executed by a processor on the node 100.

In yet another embodiment, the hybrid C-Band card 108 can trigger a fault event if the first photodiode 106 detects a loss of power, the hybrid C-Band card 108, via OSC, receives a fault event message from the upstream node 100b, and/or a fault event is identified in the automatic laser shutdown message. The L-Band card 112 can trigger the fault event if the first photodiode 106 detects a loss of power, the L-Band receives, via the optical supervisory channel, a fault event message from the upstream node, the second photodiode 110 detects a loss of power, and/or the L-Band optical loss of signal is identified in the automatic laser shutdown message. In one embodiment, if a fault event is detected, applying scenario target tilt and scenario target gain stored in the node (step 190) comprises applying the scenario target tilt and scenario target gain to each amplifier within the node wherein the scenario target tilt and scenario target gain to apply is selected from local memory based on the particular predetermined fault event scenario corresponding to the fault event detected. For example, if the fault event detected is a failure of the C-Band, the particular predetermined fault event scenario corresponding to the failure of the C-Band is selected and the associated scenario target tilt and scenario target gain are applied to each of the amplifiers. The node may then send the fault event message on the optical supervisory channel 101 to at least one or both of a downstream node and an upstream node.

In one embodiment, the fault detection engine, upon receiving a fault event message from either an upstream or a downstream node, will relay the fault event message to the downstream node or the upstream node respectively, such that the fault event message is sent to both the upstream ROADM and the downstream ROADM. The fault detection engine may further communicate any locally detected fault event to the optical supervisory channel as a fault event message. Either the upstream ROADM 42 or the downstream ROADM 42 may communicate the fault event message to the local orchestrator 22. The local orchestrator 22 may also receive the fault event message from the network status data collected by the link controller 38 or from a fault detection engine running on the optical controller 18.

In one embodiment, the local orchestrator 22, having received the fault event message, may communicate the fault event message to one or more other local orchestrators 22 and/or may communicate the fault event message to the centralized orchestrator 14. The other local orchestrators 22 and/or the centralized orchestrator 14 may then execute corrective action to route traffic around a node having a fault event. The local orchestrators 22 may use fault identification and recovery notifications to execute operations to reactivate a failed transmission signal.

In one embodiment, step 172, step 174, step 178, and step 182 or any combinations thereof may be performed at a head end ROADM 42 or a tail end ROADM 42, whereas in other embodiments, each of the steps of the fast transient recovery method 170 may be performed locally at each node.

In one embodiment, each of the photodiodes 106, 110, and 114 are a set of photodiode-filter pairs configured such that the number of photodiode-filter pairs is equal to a detection granularity desired, has a minimum number that is the number of bands monitored within the spectrum and a maximum number that is the sum of the number of channels within each band having at least one channel. By increasing the detection granularity, a fault event may be raised upon detection of failure in one or more channel in each band. In another embodiment, each of the photodiodes 106, 110, and 114 are optical performance monitors.

Figure 7:
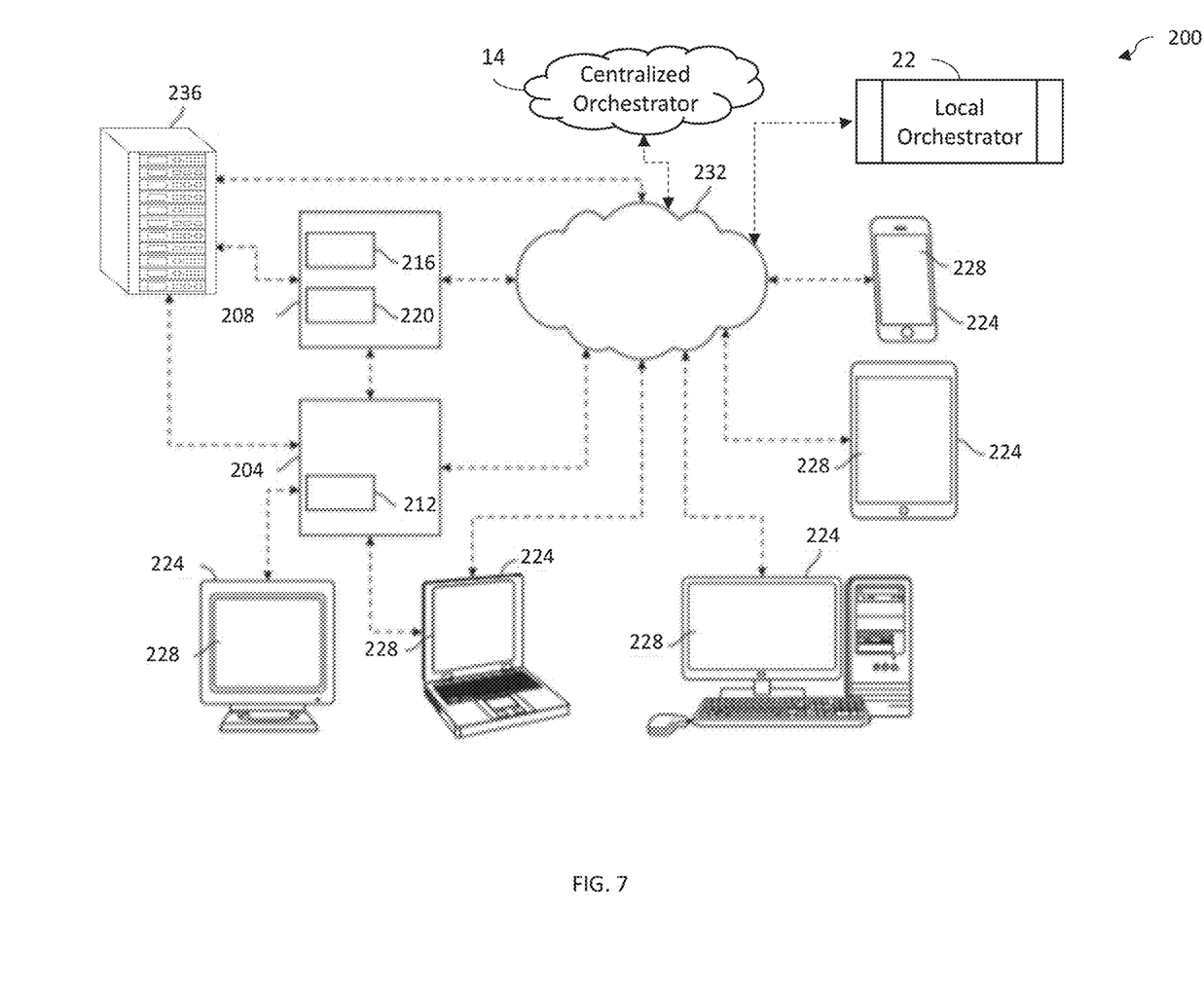
FIG. 7 is a diagram of an exemplary embodiment of a computer system implementing the present disclosure.

Referring now to FIG. 7, shown therein is a computer system 200 in accordance with the present disclosure designed to carry out the optical power control method. The optical power control method may be carried out on one or more computer system 200. The computer system 200 may comprise one or more processor 204, one or more non-transitory computer-readable storage medium 208, and one or more communication component 212. The one or more non-transitory computer-readable storage medium 208 may store one or more database 216 and program logic 220. The one or more database may comprise the policies discussed above and/or other data. The computer system 200 may bi-directionally communicate with a plurality of user devices 224, which may or may not have one or more screens 228, and/or may communicate via a network 232.

The processor 204 or multiple processors 204 may or may not necessarily be located in a single physical location.

In one embodiment, the non-transitory computer-readable storage medium 208 stores program logic, for example, a set of instructions capable of being executed by the one or more processor 204, that when executed by the one or more processor 204 causes the one or more processor 204 to carry out the optical power control method.

In one embodiment, the network 232 is the Internet and the user devices 224 interface with the system via the communication component 212 and a series of web pages. It should be noted, however, that the network 232 may be almost any type of network and may be implemented as the World Wide Web (or Internet), a local area network (LAN), a wide area network (WAN), a metropolitan network, a wireless network, a cellular network, a Global System for Mobile Communications (GSM) network, a code division multiple access (CDMA) network, a 3G network, a 4G network, a 5G network, a satellite network, a radio network, an optical network, a cable network, a public switched telephone network, an Ethernet network, combinations thereof, and/or the like. It is conceivable that in the near future, embodiments of the present disclosure may use more advanced networking topologies.

In one embodiment, the computer system 200 comprises a server system 236 having multiple servers in a configuration suitable to provide a commercial computer-based business system such as a commercial web-site and/or data center. The server system 236 may be connected to the network 232.

The computer system 200 is in communication with the centralized orchestrator 14 and/or one or more local orchestrator 22. In one embodiment, the computer system 200 is an element of the field replaceable unit, or FRU.

Referring now to FIG. 8A, shown therein is a first graph 250 having an X-axis 254 depicting wavelength of a signal in nanometers and a Y-axis 258 depicting power level of the signal at differing wavelengths at a first instance in time. The wavelengths along the X-axis 254 are shown shortest to longest from the left to the right and are sectioned into a C-Band 262 and an L-Band 266, each Band 262 and 266 having one or more channel 268. As shown in the first graph 250, the power levels for the C-Band 262 and the L-Band 266 are substantially similar. Referring now to FIG. 8B, shown therein is a second graph 250' having the X-axis 254 depicting wavelength of the signal in nanometers and the Y-axis 258 depicting power level of the signal at differing wavelengths at a second instance in time, the second instance in time being after the first instance in time. The wavelength along the X-axis 254 are shown shortest to longest from the left to the right and are sectioned into a C-Band 262 and an L-Band 266, each Band 262 and 266 having one or more channel 268. As shown in the second graph 250', the power levels for the C-Band 262 and the L-Band 266 have a linear tilt slope 270. The linear tilt slope 270 is a slope, in dB/THz, of the power level of the signal from a lowest power level 274 at the shortest wavelength in the C-Band 262 and a highest power level 274 at the longest wavelength in the L-Band 266.

From the above description, it is clear that the inventive concepts disclosed and claimed herein are well adapted to carry out the objects and to attain the advantages mentioned herein, as well as those inherent in the invention. While exemplary embodiments of the inventive concepts have been described for purposes of this disclosure, it will be understood that numerous changes may be made which will readily suggest themselves to those skilled in the art and which are accomplished within the spirit of the inventive concepts disclosed and claimed herein.

What is claimed is:

1. An optical device, comprising:
   an amplifier configured to amplify an optical signal in at least one of the C-Band or the L-Band;
   a controller including a processor and a non-transitory computer readable medium, the non-transitory computer readable medium storing computer executable code that when executed by the processor causes the processor to:
   responsive to a fault event message affecting the C-band or the L-Band, selecting a target tilt and gain setting from a plurality of target tilt and gain settings stored in the non-transitory computer readable medium based on the type of fault event message, and applying the selected and pre-calculated target tilt and gain settings to the amplifier.

2. The optical device of claim 1, wherein the fault event message is formed by monitoring an input power of the optical signal in either the C-Band or the L-Band, or both, and, responsive to the input power being below an input power expectation, raising a fault event message.

3. The optical device of claim 1, wherein the fault event message is formed by monitoring an output power of the optical signal in either the C-Band or the L-Band, or both, and, responsive to the output power being below an output power expectation, raising a fault event message.

4. The optical device of claim 1, wherein the fault event message is received from an upstream node or a downstream node.

5. The optical device of claim 1, wherein the fault event message is formed by monitoring an input power of the optical signal in either the C-Band or the L-Band, or both, and, responsive to the input power being below an input power expectation, raising a fault event message.

6. The optical device of claim 1, wherein the non-transitory computer readable medium storing computer executable code that when executed by the processor further causes the processor to send the fault event message to an optical supervisory channel.

7. The optical device of claim 6, wherein sending the fault event message to the optical supervisory channel includes sending the fault event message to one or more upstream node and one or more downstream node.

8. The optical device of claim 1, wherein the fault event message includes at least one fault component, the fault component being a component of the optical device the amplifier that monitors one or more condition of the optical device for a fault event, the fault event being a condition of the optical device that indicates the optical device is operating outside normal operating conditions.

9. The optical device of claim 8, wherein the one or more condition comprises low optical signal input power, high optical signal input power, low optical signal output power, high optical signal output power, optical signal input power outside expected margins, automatic laser shutdown messages including a fault, a message from an upstream node indicating a fault, and a message from a downstream node indicating a fault.

* * * * *